(12) United States Patent
Kimble

(10) Patent No.: US 8,213,084 B2
(45) Date of Patent: Jul. 3, 2012

(54) METHOD AND APPARATUS FOR COMPENSATION OF MECHANICAL DISTURBANCES IN OPTICAL INTERFEROMETERS

(75) Inventor: H. Jeff Kimble, La Canada, CA (US)

(73) Assignee: California Institute of Technology, Pasadena, CA (US)

( * ) Notice: Subject to any disclaimer, the term of this patent is extended or adjusted under 35 U.S.C. 154(b) by 1128 days.

(21) Appl. No.: 12/080,355

(22) Filed: Apr. 1, 2008

(65) Prior Publication Data
US 2008/0247066 A1    Oct. 9, 2008

Related U.S. Application Data

(60) Provisional application No. 61/040,335, filed on Mar. 28, 2008, provisional application No. 60/922,297, filed on Apr. 6, 2007.

(51) Int. Cl.
*G02B 5/08* (2006.01)
*G02B 7/182* (2006.01)
*G02B 27/00* (2006.01)
*G01B 9/02* (2006.01)

(52) U.S. Cl. ........ 359/577; 359/578; 359/584; 359/848; 359/883; 356/450; 356/498

(58) Field of Classification Search .................. 359/577, 359/578, 584, 848, 883; 356/450, 486, 498, 356/513, 517
See application file for complete search history.

(56) References Cited

U.S. PATENT DOCUMENTS

| 4,756,602 A * | 7/1988 | Southwell et al. ............ 359/588 |
| 4,778,251 A * | 10/1988 | Hall et al. ..................... 359/586 |
| 4,993,824 A * | 2/1991 | Bluege .......................... 359/846 |
| 6,134,049 A * | 10/2000 | Spiller et al. .................. 359/590 |
| 6,256,147 B1 * | 7/2001 | Davis ............................ 359/580 |
| 6,717,729 B2 * | 4/2004 | Goto et al. ............... 359/485.02 |
| 6,893,986 B2 * | 5/2005 | Amer et al. .................... 438/795 |
| 7,203,275 B2 * | 4/2007 | Shiraishi ........................ 378/84 |

* cited by examiner

*Primary Examiner* — Ricky D Shafer
(74) *Attorney, Agent, or Firm* — Christie, Parker & Hale, LLP

(57) ABSTRACT

A fundamental limit to the sensitivity of optical interferometry is thermal noise that drives fluctuations in the positions of the surfaces of the interferometer's mirrors, and thereby in the phase of the intracavity field. A scheme for substantially reducing this thermally driven phase noise is provided in which the strain-induced phase shift from a mirror's optical coating cancels that due to the concomitant motion of the substrate's surface. As such, although the position of the physical surface may fluctuate, the optical phase upon reflection can be largely insensitive to this motion.

15 Claims, 15 Drawing Sheets

Sapphire substrate
Diameter = 3 mm
Thickness = 1 mm $f_n = 2.22$ MHz $\dfrac{\varepsilon_{zz}}{\Delta q_0} \approx 1600/m$ $\alpha_n \approx 2.7$

METHOD AND APPARATUS FOR COMPENSATION OF MECHANICAL DISTURBANCES IN OPTICAL INTERFEROMETERS

CROSS-REFERENCE TO RELATED APPLICATION(S)

This application claims priority to and the benefit of U.S. Provisional Application No. 60/922,297, filed on Apr. 6, 2007, the entire content of which is incorporated herein by reference. In addition, this application claims priority to and the benefit of U.S. Provisional Application No. 61/040,335, filed on Mar. 28, 2008, the entire content of which is also incorporated herein by reference.

STATEMENT REGARDING FEDERALLY SPONSORED RESEARCH OR DEVELOPMENT

The U.S. Government has certain rights in this invention pursuant to Grant No. PHY0140355 awarded by the National Science Foundation.

FIELD OF THE INVENTION

The invention relates generally to optical interferometers. More particularly, the invention relates to a method and an apparatus for compensation of mechanical disturbances in optical interferometers.

BACKGROUND OF THE INVENTION

Thermal noise presents a fundamental limit to measurement sensitivity in diverse areas of science and technology. One particularly important setting is that of optical interferometry in which otherwise stable structures experience small, thermally driven fluctuations in their dimensions that lead to performance limitations in applications ranging from laser spectroscopy and frequency metrology [1, 2], to the detection of gravitational waves [3], and to the realization of quantum behavior for macroscopic objects.

[1] K. Numata, M. Ando, K. Yamanloto, S. Otsuka, and K. Tsubono, Phys. Rev. Lett. 91, 260602 (2003), the entire content of which is incorporated herein by reference.
[2] K. Numata, A. Kemery, and J. Camp, Phys. Rev. Lett. 93, 250602 (2004), the entire content of which is incorporated herein by reference.
[3] V. B. Braginsky, M. L. Gorodetsky, and S. P. Vyatchanin, Phys. Lett. A 264, 1 (1999), the entire content of which is incorporated herein by reference.

For definiteness, consider a Fabry-Perot resonator formed by the reflective surfaces of two mirrors that are either freely suspended (e.g., one arm of a gravitational wave interferometer) or separated by a rigid spacer (e.g., laser stabilization for an optical atomic clock). Over frequency regimes of practical importance for such interferometers, the dominant limitation to length stability often originates from thermally driven displacement noise for the reflective surfaces of the mirror substrates, and not from the supporting structure [2]. The fluctuations of the mirror surfaces are of fundamental origin and arise from small, dissipative components of the elastic constants of the mirror and substrate materials as demanded by the Fluctuation-Dissipation Theorem [4, 5, 6]. As discussed above, these thermally driven fluctuations lead to performance limitations in applications ranging from laser spectroscopy and frequency metrology, to the detection of gravitational waves, and to the realization of quantum behavior for macroscopic objects. As such, there is a need to provide an optical interferometer that is insensitive to thermal noise.

[4] H. B. Callen and T. A. Welton, Phys. Rev. 83, 34 (1951), the entire content of which is incorporated herein by reference.
[5] H. B. Callen and R. F. Greene, Phys. Rev. 86,702 (1952), the entire content of which is incorporated herein by reference.
[6] R. F. Greene and H. B. Callen, Phys. Rev. 88, 1387 (1952), the entire content of which is incorporated herein by reference.

SUMMARY OF THE INVENTION

An aspect of an embodiment of the present invention is directed toward a method and an apparatus for substantially reducing mechanical disturbance, such as thermally driven phase noise, in an optical interferometer in which a strain-induced phase shift from an optical interferometer mirror's optical coating substantially cancels that due to the concomitant motion of the substrate's surface. As such, even though the position of the physical surface may fluctuate, the optical phase upon reflection can be largely insensitive to this concomitant motion.

An embodiment of the present invention provides a mirror of an optical interferometer. The mirror includes a mirror substrate and an optical coating on the mirror substrate. Here, a mechanical disturbance of the mirror substrate and the optical coating leads to a reflective surface displacement noise of the mirror. The reflective surface displacement noise produces a first phase shift (e.g., a piston phase shift $\delta\theta$) of a given wavevector reflected from the mirror. The optical coating includes an optical layer (internal Fabry-Perot) configured to produce a second phase shift (e.g., a coating phase shift $\delta\beta$) of the given wavevector and the second phase shift substantially compensating for the first phase shift.

In one embodiment, the second phase shift is produced from a strain of the optical coating that results from the mechanical disturbance.

In one embodiment, the first phase shift and the second phase shift are substantially equal to a total phase shift (e.g., $\delta\Phi$) of the mechanical disturbance, and the optical layer of the optical coating is configured such that the total phase shift is substantially equal to zero (e.g., $\delta\Phi=\delta\beta+\delta\theta=0$).

In one embodiment, the mechanical disturbance is a thermal fluctuation of the mirror substrate and the optical coating. The thermal fluctuation may be a function of the Boltzmann constant ($k_B$) and a given temperature (T).

In one embodiment, the optical coating includes a plurality of first layers (e.g., eight layers) and a plurality of second layers (e.g., 25 layers), and the optical layer is between the plurality of first layers and the plurality of second layers. The plurality of first layers may be smaller in number than the plurality of second layers, and the plurality of second layers is between the optical layer and the mirror substrate.

In one embodiment, a thickness of the optical layer is a multiple (j) of a half of a wavelength of the given wavevector.

Another embodiment of the present invention provides a mirror of an interferometer. The mirror includes a first region of a mirror substrate, a first optical coating, a second region of the mirror substrate, and a second optical coating. In this embodiment, the first optical coating has a coating reflectivity $r_0$ at z=0, and is on the first region of the mirror substrate. The second optical coating has a coating reflectivity $r_2$ at $z=z_2$ and is between the first region of the mirror substrate (e.g., having a thickness that is from 0 to $z_2$) and the second region of the substrate (e.g., having a thickness that is from $z_2$ to infinite half space, or to the terminating end of a substrate of finite thickness). Here, a mechanical disturbance of the first and second regions of the mirror substrate and the first and second optical coatings leads to a reflective surface displacement noise of the mirror, the reflective surface displacement noise producing a first phase shift of a given wavevector reflected from the mirror $r_0$, and the first region of the mirror substrate has a thickness configured to produce a second phase shift of the given wavevector, the second phase shift substantially compensating for the first phase shift.

In one embodiment, the mechanical disturbance is a thermal fluctuation of the first and second regions of the mirror substrate and the first and second optical coatings. The thermal fluctuation may be a function of the Boltzmann constant and a given temperature.

In one embodiment, the first optical coating includes a plurality of first layers, and the second optical coating includes a plurality of second layers.

A more complete understanding of the method and apparatus for compensation of mechanical disturbances in optical interferometers will be afforded to those skilled in the art, as well as a realization of additional advantages and objects thereof, by a consideration of the following detailed description. Reference will be made to the appended sheets of drawings which will first be described briefly.

BRIEF DESCRIPTION OF THE DRAWINGS

The patent or application file contains at least one drawing/picture executed in color. Copies of this patent or patent application publication with color drawing/picture(s) will be provided by the Office upon request and payment of the necessary fee.

The accompanying drawings, together with the specification, illustrate exemplary embodiments of the present invention, and, together with the description, serve to explain the principles of the present invention.

DETAILED DESCRIPTION

Figure 1:
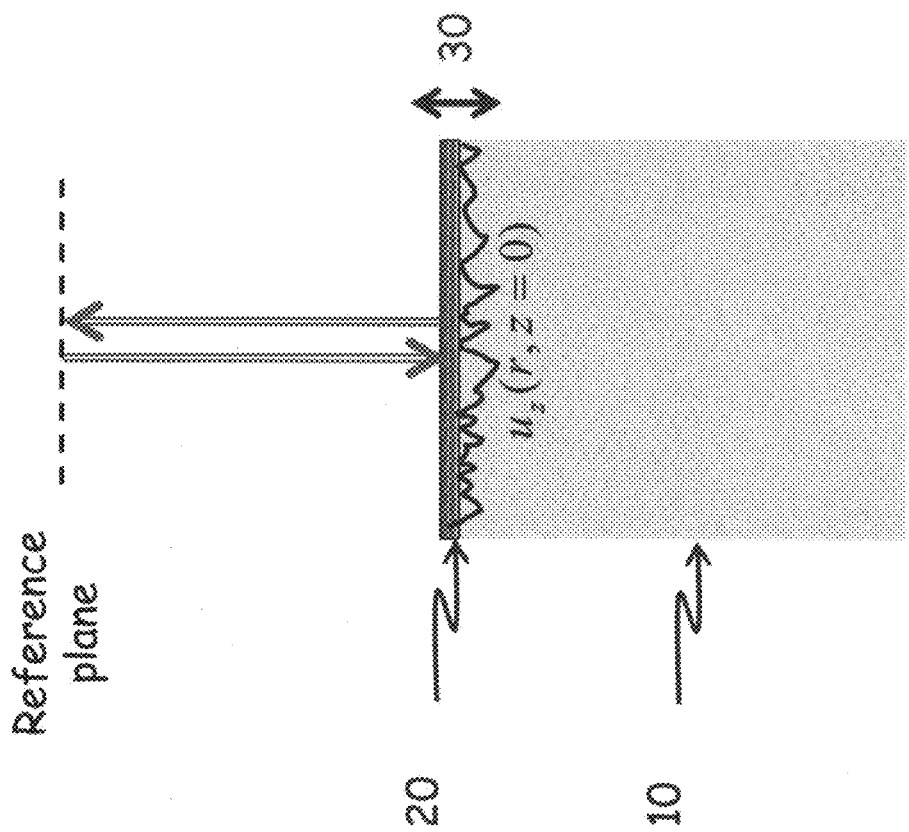
FIG. 1 is a schematic of a mirror of an optical interferometer that includes a mirror substrate and an optical coating.

In the following detailed description, only certain exemplary embodiments of the present invention are shown and described, by way of illustration. As those skilled in the art would recognize, the invention may be embodied in many different forms and should not be construed as being limited to the embodiments set forth herein. Also, in the context of the present application, when an element is referred to as being "on" another element, it can be directly on the other element or be indirectly on the other element with one or more intervening elements interposed therebetween. Like reference numerals designate like elements throughout the specification.

A fundamental limit to the sensitivity of optical interferometry is thermal noise that drives fluctuations in the positions of the surfaces of the interferometer's mirrors, and thereby in the phase of the intracavity field. An embodiment of the present invention relates to a scheme for substantially reducing this thermally driven phase noise in which the strain-induced phase shift from an optical interferometer mirror's optical coating cancels that due to the concomitant motion of the substrate's surface. Here, in one embodiment of the present invention, although the position of the physical surface may fluctuate, the optical phase upon reflection can be substantially insensitive to this concomitant motion.

An embodiment of the present invention can be utilized with a Fabry-Perot resonator, which can be formed by reflective surfaces for two mirrors that are either freely suspended (e.g., one arm of a gravitational wave interferometer) or separated by a rigid spacer (e.g., laser stabilization for an optical atomic clock). As described above, over frequency regimes of practical importance for such interferometers, the dominant limitation to length stability often originates from thermally driven displacement noise for the reflective surfaces of the mirror substrates, and not from the supporting structure [2]. The fluctuations of the mirror surfaces are of fundamental origin and arise from small, dissipative components of the elastic constants of the mirror and substrate materials as demanded by the Fluctuation-Dissipation Theorem [4, 5, 6].

For a single mirror, a displacement $u_z$, along the optic axis z perpendicular to the mirror's surface results in a phase shift $\theta=2ku_z$ for a field of wavevector $\vec{k}$ reflected at normal incidence from the surface. Hence, displacement noise $\delta u_z$ driven by thermal fluctuations leads to phase noise δθ for the intracavity field, which limits the interferometric sensitivity. Beyond displacements driven by internal thermal noise of the substrate itself [7, 8, 9, 10], various other sources of mechanical noise have been identified in recent years, including noise from frictional losses in the materials that form the mirror coating [8, 11, 12] and thermoelastic-damping in both the substrate and coating [3, 10, 13]. Measurements of phase noise in both rigid [2] and suspended interferometers [14, 15] have confirmed many characteristics of individual noise sources predicted by theoretical analyses.

[7] P. R. Saulson, Phys. Rev. D42, 2437 (1990), the entire content of which is incorporated herein by reference.
[8] Yu. Levin, Phys. Rev. D57, 659 (1998), the entire content of which is incorporated herein by reference.
[9] F. Bondu, P. Hello, and J.-Y. Vinet, Phys. Lett. A 246, 227 (1998), the entire content of which is incorporated herein by reference.
[10] Y. T. Lui and K. S. Thorne, Phys. Rev. D62, 122002 (2000), the entire content of which is incorporated herein by reference.
[11] G. M. Harry et al. Classical and Quantum Gravity 19, 897 (2002), the entire content of which is incorporated herein by reference.
[12] G. M. Harry et al., Appl. Opt. 45, 1569 (2006), the entire content of which is incorporated herein by reference.
[13] V. B. Braginsky and S. P. Vyatchanin, Phys. Lett. A 312, 244 (2003), the entire content of which is incorporated herein by reference.
[14] E. D. Black et al. Phys. Lett. A 328. 1 (2004), the entire content of which is incorporated herein by reference.
[15] E. D. Black, A. Villar, and K. G. Libbrecht, Phys. Rev. Lett. 93, 241101 (2004), the entire content of which is incorporated herein by reference.

Various avenues have been followed for reducing thermal noise in optical interferometers, the most significant of which is to lower mechanical losses for the substrate and suspension materials and, more recently, the coatings [16]. New designs for advanced interferometers have been proposed, including the use of a corner reflector [17] or a short Fabry-Perot cavity [18] to replace the usual single surface of a mirror.

[16] G. M. Harry et al., Classical Quantum Gravity 24, 405 (2007), the entire content of which is incorporated herein by reference.
[17] V. B. Braginsky and S. P. Vyatchanin, Phys. Lett. A 324, 345 (2004), the entire content of which is incorporated herein by reference.
[18] F. Ya. Khalili, Phys. Lett. A 334, 67-72 (2005), the entire content of which is incorporated herein by reference.

An embodiment of the present invention provides a new scheme for substantially reducing thermally driven phase noise in optical interferometers. Fundamental to certain embodiments of the present invention is the observation by the present inventive entity that a displacement $\delta u_z$ of the surface of a mirror is necessarily accompanied by strain in the underlying materials of the mirror coating and substrate. That is, a typical mirror is composed of multiple layers of low-loss dielectrics deposited upon the mirror substrate [19]. Thermally driven strain in such a coating produces a phase shift $\delta\beta$ of the field reflected from the mirror. For standard high reflectivity mirrors, it is most often the case that $|\delta\beta| \ll |\delta\theta|$. However, as envisioned, by suitable design of the multilayer dielectric coating, an embodiment of the present invention can achieve a total phase shift $\delta\Phi = \delta\beta + \delta\theta = 0$ for certain geometries and wavelengths of operation. That although the physical surface of the mirror is still subject to random displacements $\delta u_z$, the phase of a field reflected from the mirror will be insensitive to these displacements. The phase $\delta\theta$ from $\delta u_z$ is compensated by a concomitant phase change $\delta\beta(\delta u_z)$ arising from strain-induced modifications of the coating properties.

[19] G. Rempe, R. J. Thompson, H. 3. Kimble, and R. Lalozari, Opt. Lett. 17, 363 (1992), the entire content of which is incorporated herein by reference.

Here, an embodiment of the present invention provides a quantitative relationship between the surface displacement $\delta u_z$ and the resulting strain $\in(\delta u_z)$, and hence $\delta\beta(\delta u_z)$. As envisioned, this functional relationship will depend upon the frequency range of operation (e.g., at a frequency $\omega_i$ corresponding to a resonant mode of oscillation for the mirror, or in the low frequency regime with $\omega \ll \{w_i\}$ where $\{\omega_i\}$ is the set of resonant frequencies for the structure). It will also depend upon on the configuration of the coating and mirror substrate (i.e., the design of the coating and the mechanical structure of coating and substrate). Other issues relate to the sensitivity to fabrication tolerances and the role of fluctuations in the optical power within the coating. However, as envisioned, certain embodiments of the present invention provide suitable schemes for particular configurations that will find applications in various suitable scientific and technological settings for enhancing the sensitivity and stability of optical interferometers.

In more detail, referring to FIG. 1, a mirror of an optical interferometer includes a mirror substrate 10 and an optical coating 20. Here, a mechanical disturbance, such as thermal driven fluctuations, in position of mirror surface 30, leads to phase fluctuations in optical interferometry. That is, as shown in FIG. 1, the thermal driven fluctuations of the mirror substrate 10 and the optical coating 20 in the position of mirror surface lead to a displacement noise producing a piston phase shift (or surface phase shift) of a given wavevector reflected from the mirror in the optical interferometer that can be written as, $\delta\theta(r) = 2ku_z(r, z=0)$. Here, as shown, the displacement noise is represented by $u_z(r, z=0)$.

Figure 2:
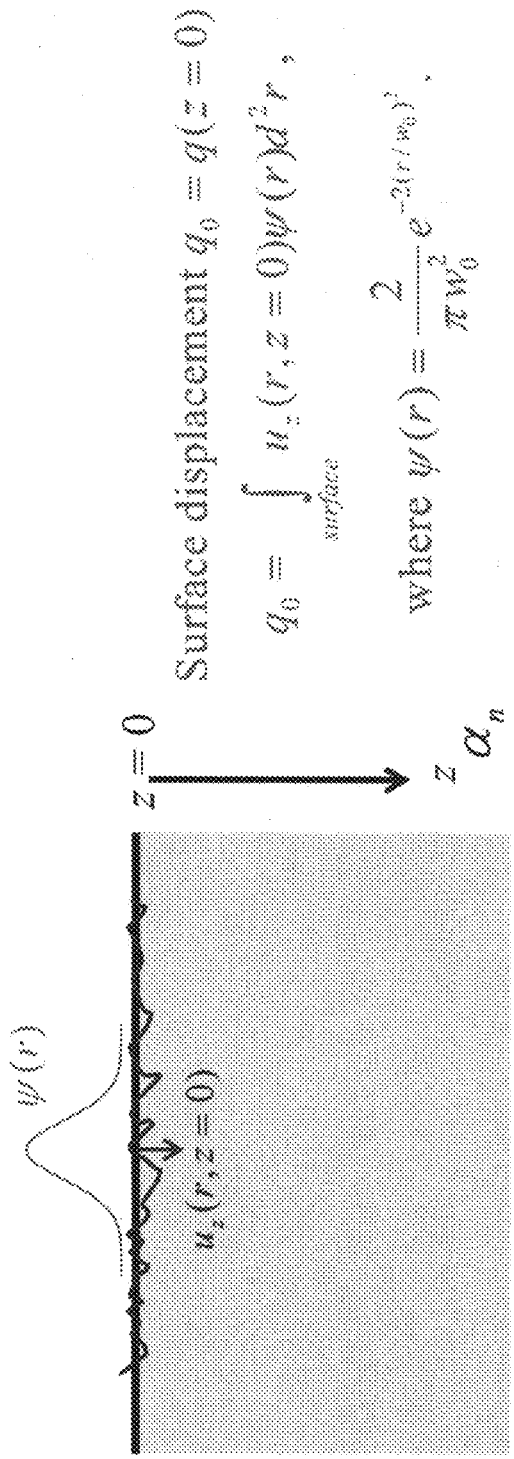
FIG. 2 is a schematic illustrating a calculation of spectral density fluctuations of surface displacement of a mirror of an optical interferometer.

A calculation of spectral density fluctuations of surface displacement of a mirror of an optical interferometer is shown in FIG. 2. However, the present invention is not thereby limited, and it should be apparent to those skilled in the art that the fluctuations of the surface displacement can be determined and/or approximated by other suitable calculations.

Figure 3:
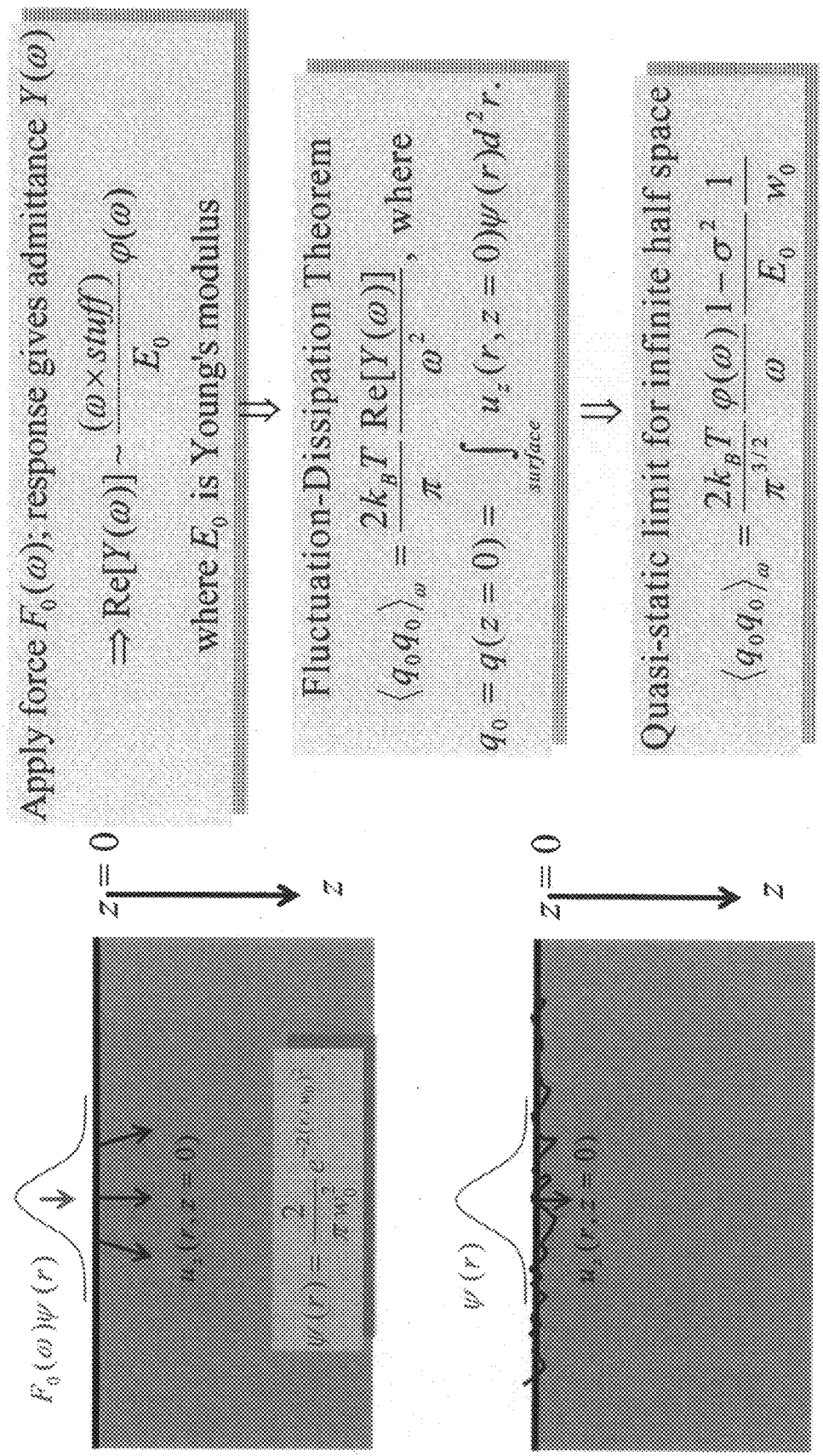
FIG. 3 is a schematic illustrating a calculation for spectral density of axial surface displacement of a mirror of an optical interferometer.

FIG. 3 illustrates a methodology for calculating the spectral density of axial surface displacement pursuant to an aspect of an embodiment of the present invention. The mathematical basis for this calculation are discussed in Levine [8]; Bondu, Hello and Vinet [9]; Liu and Thorne [10]; and G. M. Harry et al., Classical and Quantum Gravity 19, 897 [11]; which are incorporated by reference herein in their entirety.

Figure 4A:
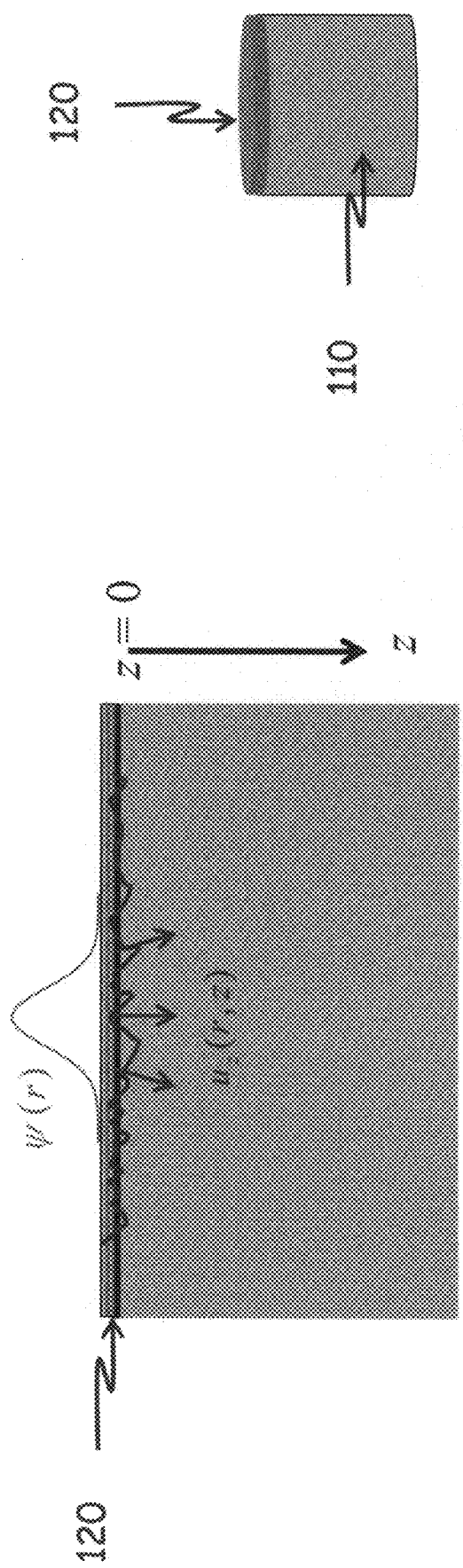
FIG. 4A is a schematic illustrating a relationship between the surface displacement $q_0$ and the axial strain $\in_{zz}$, of a mirror of an optical interferometer.

Referring to FIG. 4A, a relationship between the surface displacement $q_0$ and the axial strain $\in_{zz}$ is shown. In particular, an optical coating 120 on a mirror substrate 110 of a mirror of an interferometer will be strained by thermal fluctuations that drive the surface deformations. As such, the nature of the modification of the coating's optical properties can be derived as described in more detail below.

Figure 4B:
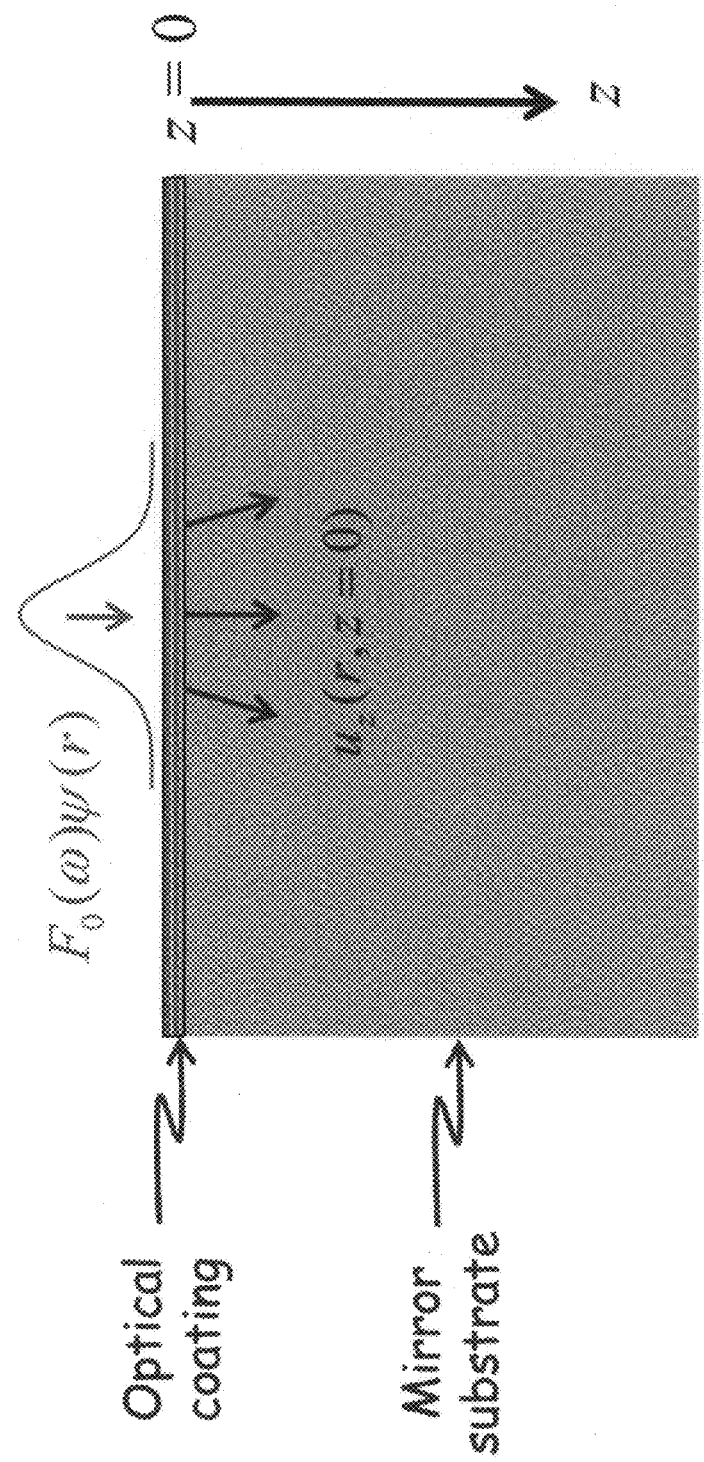
FIG. 4B is a schematic illustrating an experiment in which an external stress is applied to a coating and a substrate of a mirror of an optical interferometer to determine the total phase shift of the reflected field in the presence of the associated stresses and strains.
Figure 5:
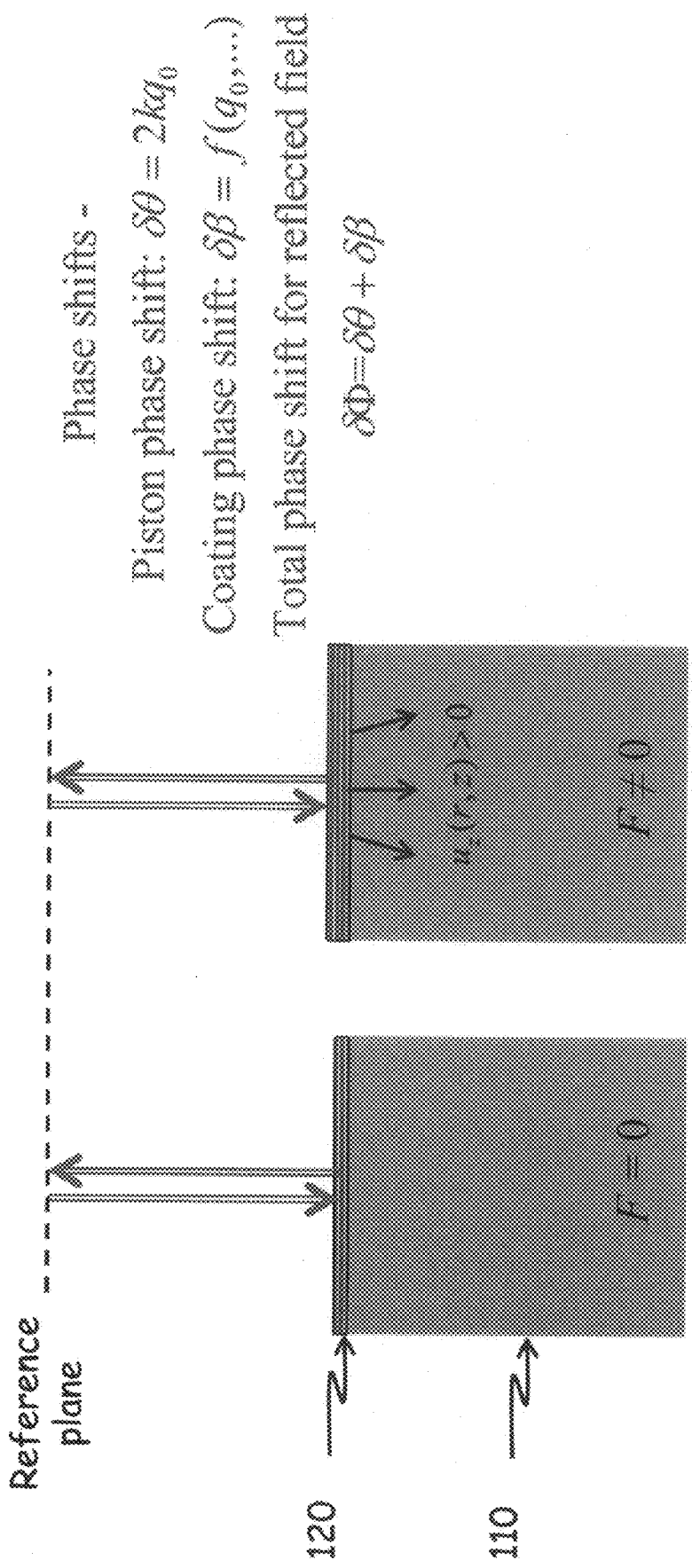
FIG. 5 is a schematic illustrating the three phase shifts that should be considered in a mirror of an optical interferometer so that the position of the physical surface of the mirror may move, but the optical phase upon reflection can still be insensitive to this motion.

Referring to FIGS. 4A and 4B, an experiment based on the discussion in Liu and Thorne [10] and G. M. Harry et al., Classical and Quantum Gravity 19, 897 [11], which are incorporated by reference herein in their entirety, can be performed in which (1) an external stress is applied to the coating 120 and the substrate 110; (2) the displacement, strains, and stress with the coating 120 and the substrate 110 can then be calculated; (3) the associated change in the optical properties of the coating 120 can then be determined; and (4) the total phase shift of the reflected field can then be derived. Here, as shown in FIG. 5, the three phase shifts that should be considered are the piston phase shift $\delta\theta$, the coating phase shift $\delta\beta$ and the total phase shift $\delta\Phi$; and that the total phase shift, in one embodiment, should be determined to be $\delta\Phi = \delta\beta + \delta\theta = 0$ so that the position of the physical surface of the mirror can move, but the optical phase upon reflection can still be insensitive to this motion. However, the present invention is not thereby limited. In general, the sum needs not be zero. That is, if the interferometer is operated at two different wavevectors $k_1$, $k_2$, then an exemplary embodiment of the present invention can record two total phase shifts $\delta\Phi(k_1)$ and $\delta\Phi(k_2)$. These two values allow the exemplary embodiment to determine the piston phase and coating phase if the properties of the coating are known. For example, with reference to FIG. 11, which will be described in more detail below, the exemplary embodiment could operate at wavevector $k_1$ where the coating phase is small (k/k0~0.998), and for which $\delta\Phi(k_1)$ arises almost entirely from the piston phase, and could simultaneously also operate at $k_2$ where the coating phase shift is ~3 times bigger than the piston phase shift and of opposite sign ($\delta\Phi(k_2)$~2 [~−1 (from piston), +3 (from coating)]. As such, from these two values $\delta\Phi(k_1)$ and $\delta\Phi(k_2)$, the exemplary embodiment could eliminate the contribution from the piston phase from the measured signals for $k_1$ and $k_2$.

Figures 6A, 6B:
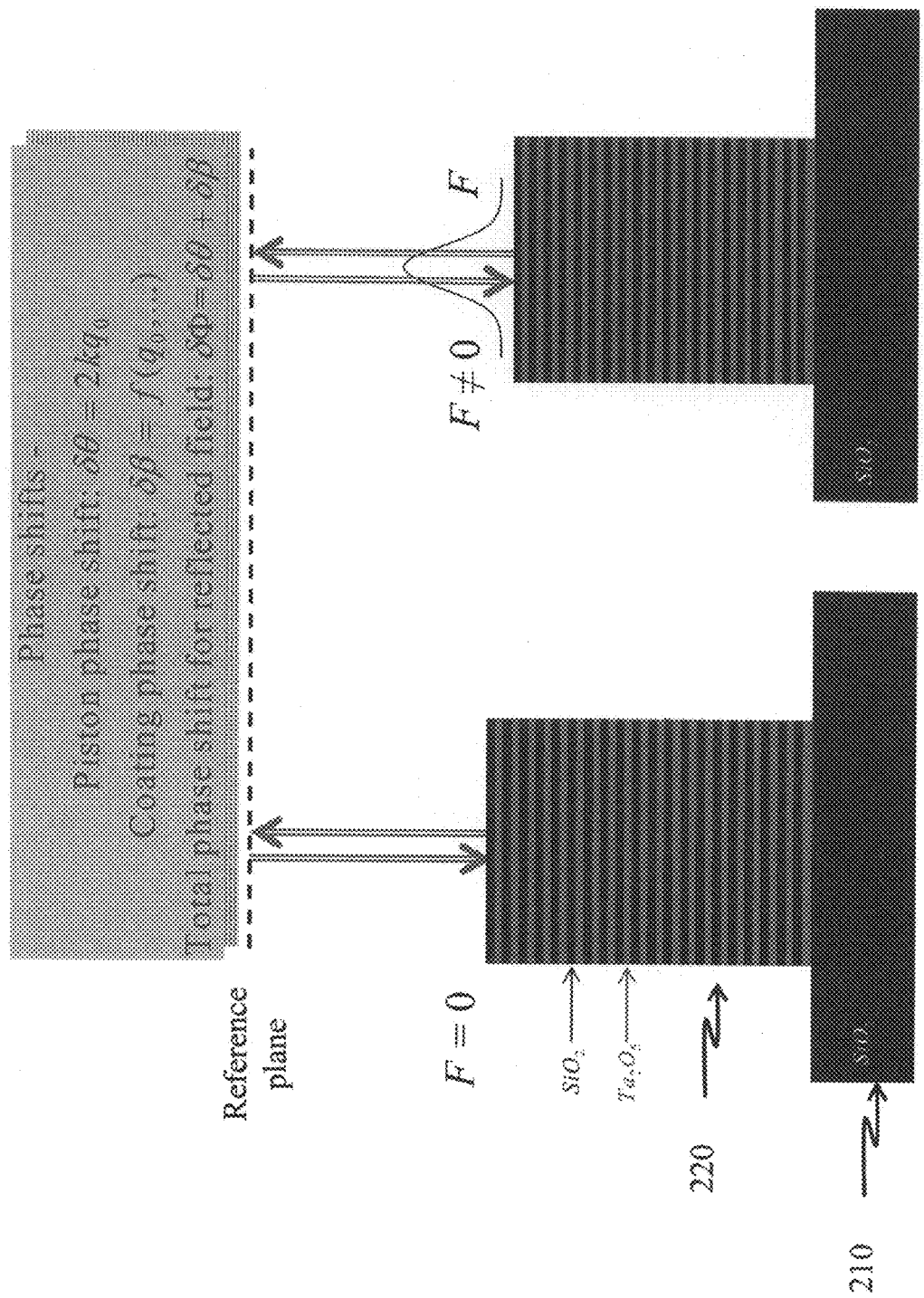
FIGS. 6A and 6B are schematics illustrating the phase shifts for a high-reflectivity-mirror with an optical coating on a mirror substrate.

FIGS. 6A and 6B illustrate the phase shifts for another high-reflectivity-mirror with an optical coating 220 on a mirror substrate 210. Here, the mirror substrate 210 is formed of $SiO_2$, and the coating 220 are formed by 20 quarter-wave pairs of $SiO_2$ and $Ta_2O_5$. Again, the three phase shifts that should be considered are the piston phase shift $\delta\theta$, the coating phase shift $\delta\beta$ and the total phase shift $\delta\Phi$. In more detail, FIG. 6A illustrates the mirror without strain, and FIG. 6B illustrates the mirror with strain.

Figure 7:
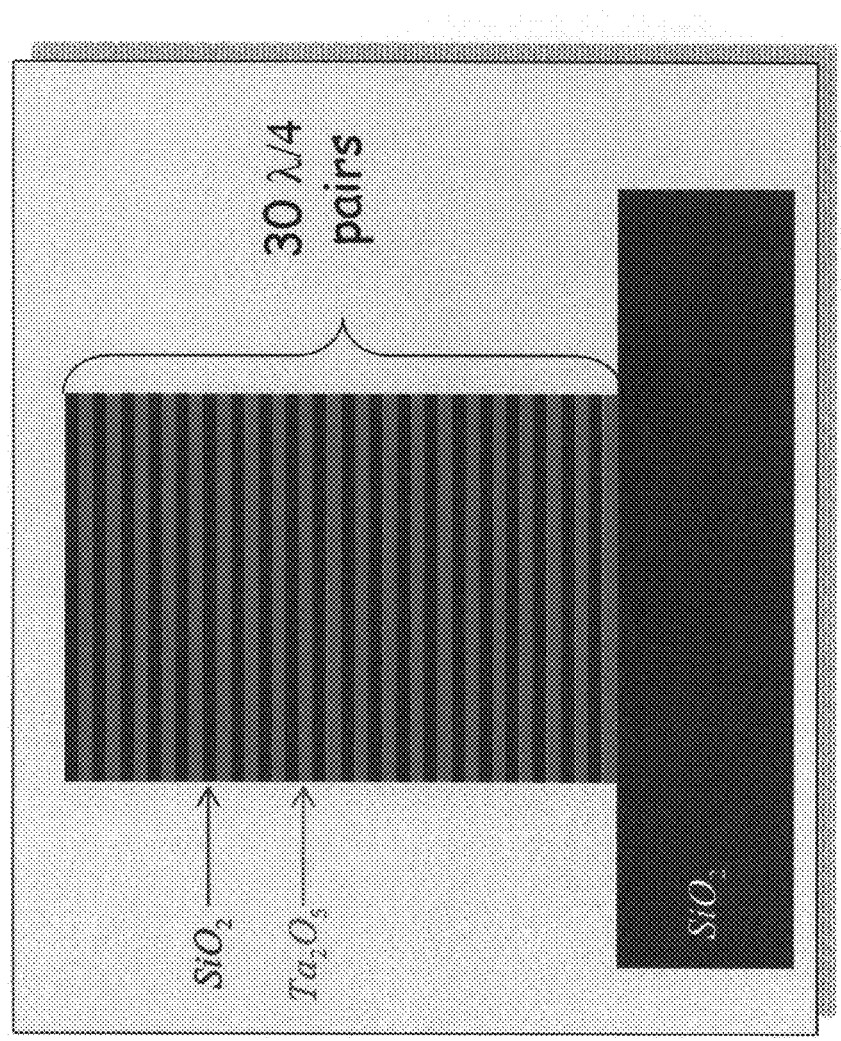
FIG. 7 is a schematic illustrating a high-reflectivity-mirror with an optical coating of 30 quarter-wave pairs.
Figure 8:
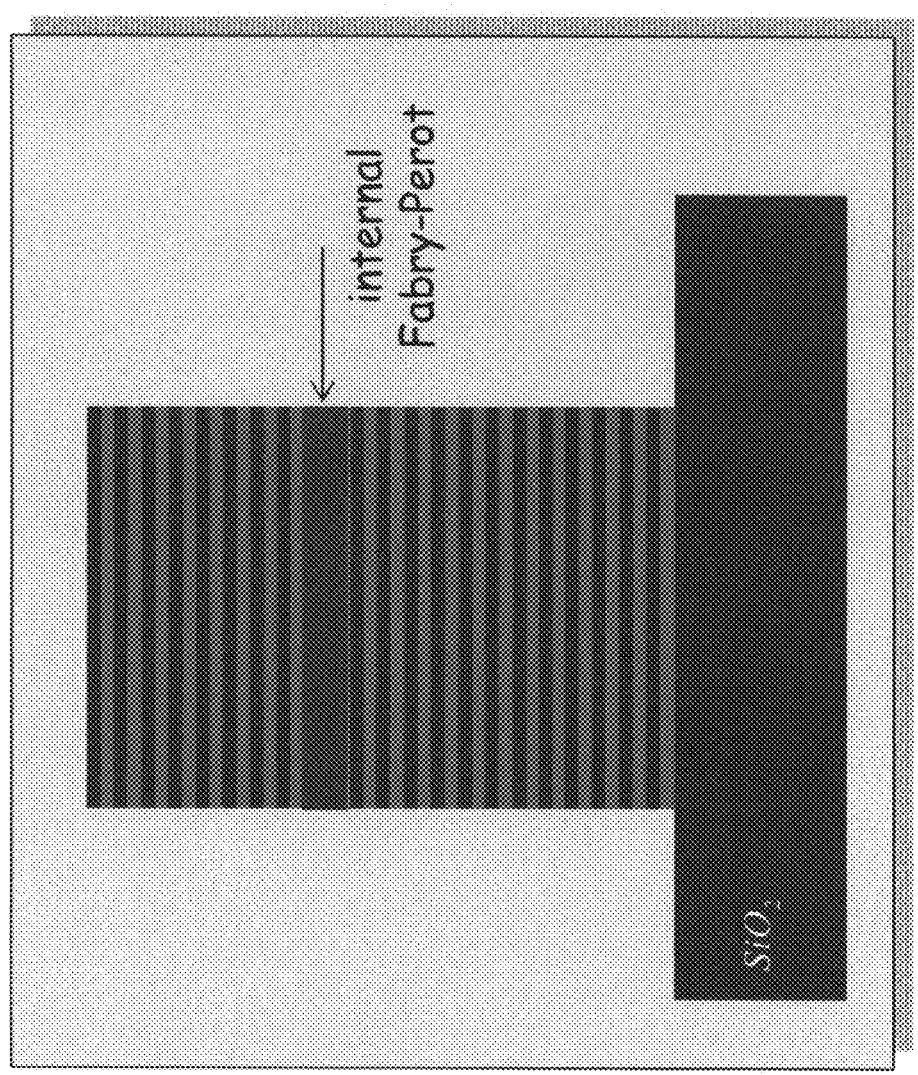
FIG. 8 is a schematic illustrating a high-reflective mirror with a coating having an internal resonant structure or thick optical layer (internal Fabry-Perot) according to an embodiment of the present invention.
Figure 9A:
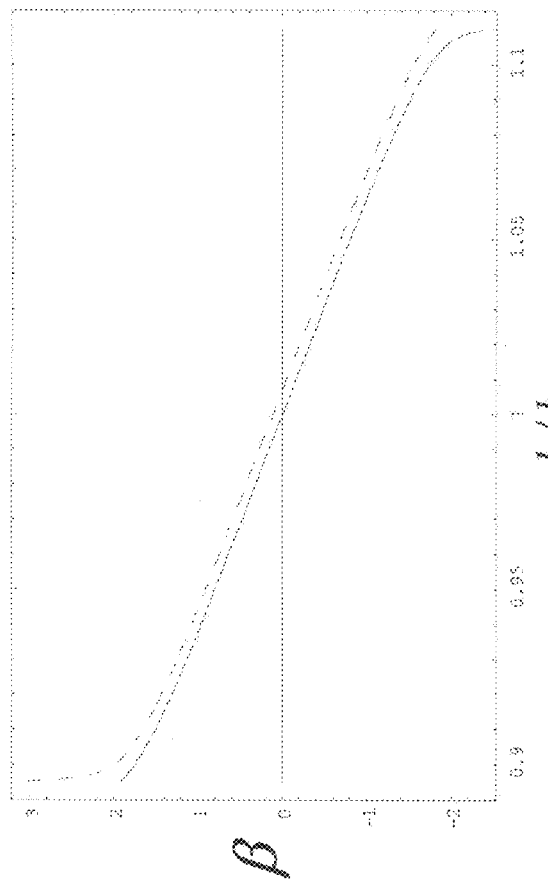
FIGS. 9A and 9B are schematics respectively illustrating the coating phase (or reflected phase β) as a function of wavevector k and the total phase shift δΦ as a function of wavelength of the mirror of FIG. 7, where δΦ is given in units of the piston phase shift δθ.
Figure 9B:
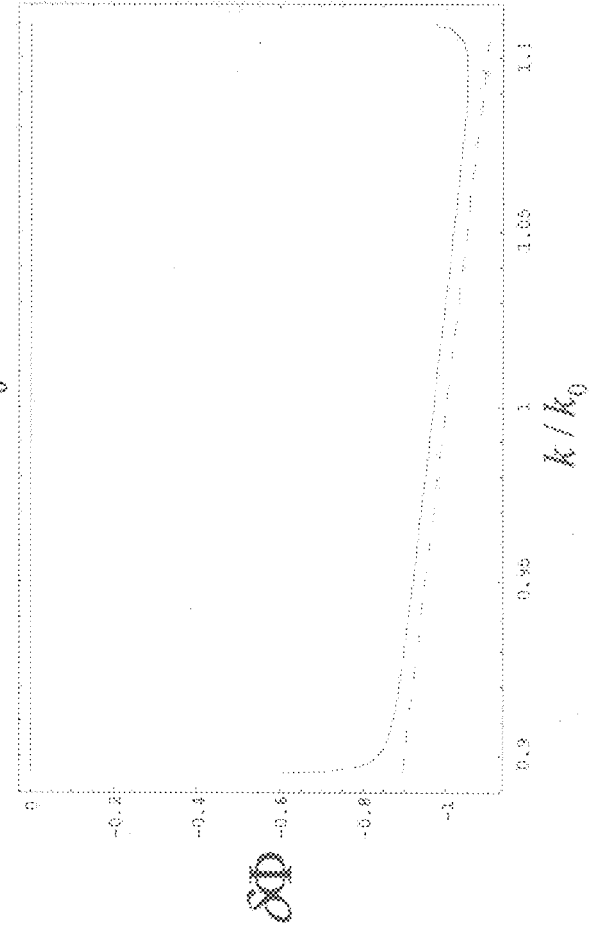
Figure 10A:
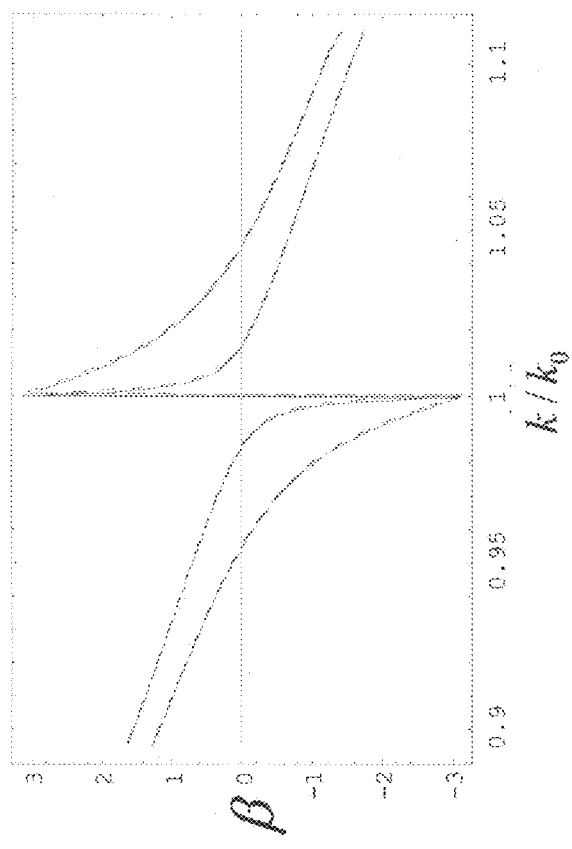
FIGS. 10A and 10B are schematics respectively illustrating the coating phase as a function of wavelength and the total phase shift as a function of wavelength of the mirror of FIG. 8.
Figure 10B:
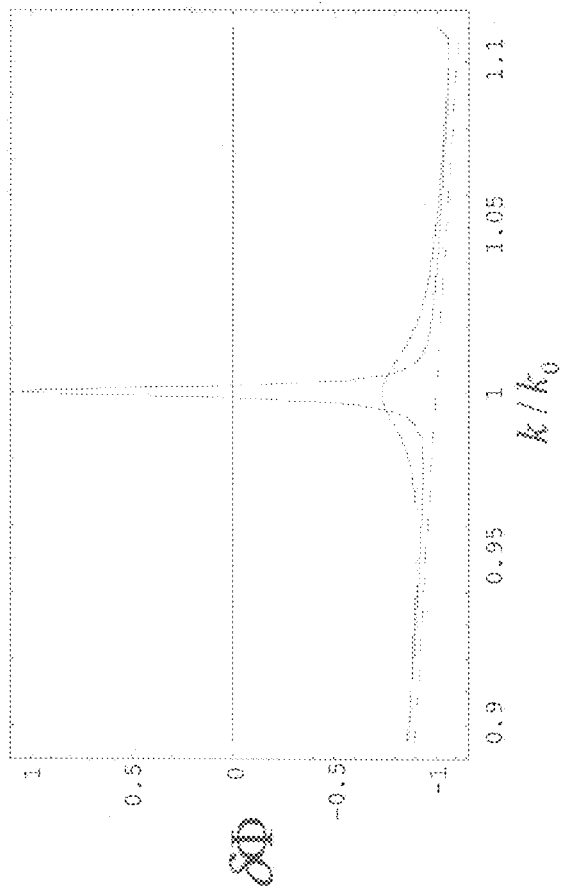

FIG. 7 illustrates a high-reflectivity-mirror with an optical coating of 30 quarter-wave pairs, and FIG. 8 illustrates a high-reflective mirror with a coating having an internal resonant structure or thick optical layer (internal Fabry-Perot) according to an embodiment of the present invention. In more detail, the coating phases (or reflected phases) $\beta$ and the total phases (or phase shifts) $\delta\Phi$ as a function of wavevector of the mirrors shown in FIGS. 7 and 8 are provided in FIGS. 9A, 9B, 10A, and 10B. Here, FIGS. 9A and 9B respectively illustrate the coating phase (or reflected phase) $\beta$ as a function of wavelength and the total phase shift $\delta\Phi$ as a function of wavelength of the mirror of FIG. 7, and FIGS. 10A and 10B respectively illustrate the coating phase $\beta$ as a function of wavelength and the total phase shift $\delta\Phi$ as a function of wavevector of the mirror of FIG. 8.

As such, in view of the foregoing and according to an embodiment of the present invention, the coating phase shift $\delta\beta$ can be suitably modified by configuring the coating of FIG. 8 so that the total phase shift $\delta\Phi=\delta\beta+\delta\theta$ can be 0 for the wavelength of a given wavevector of the reflected light.

Figure 11:
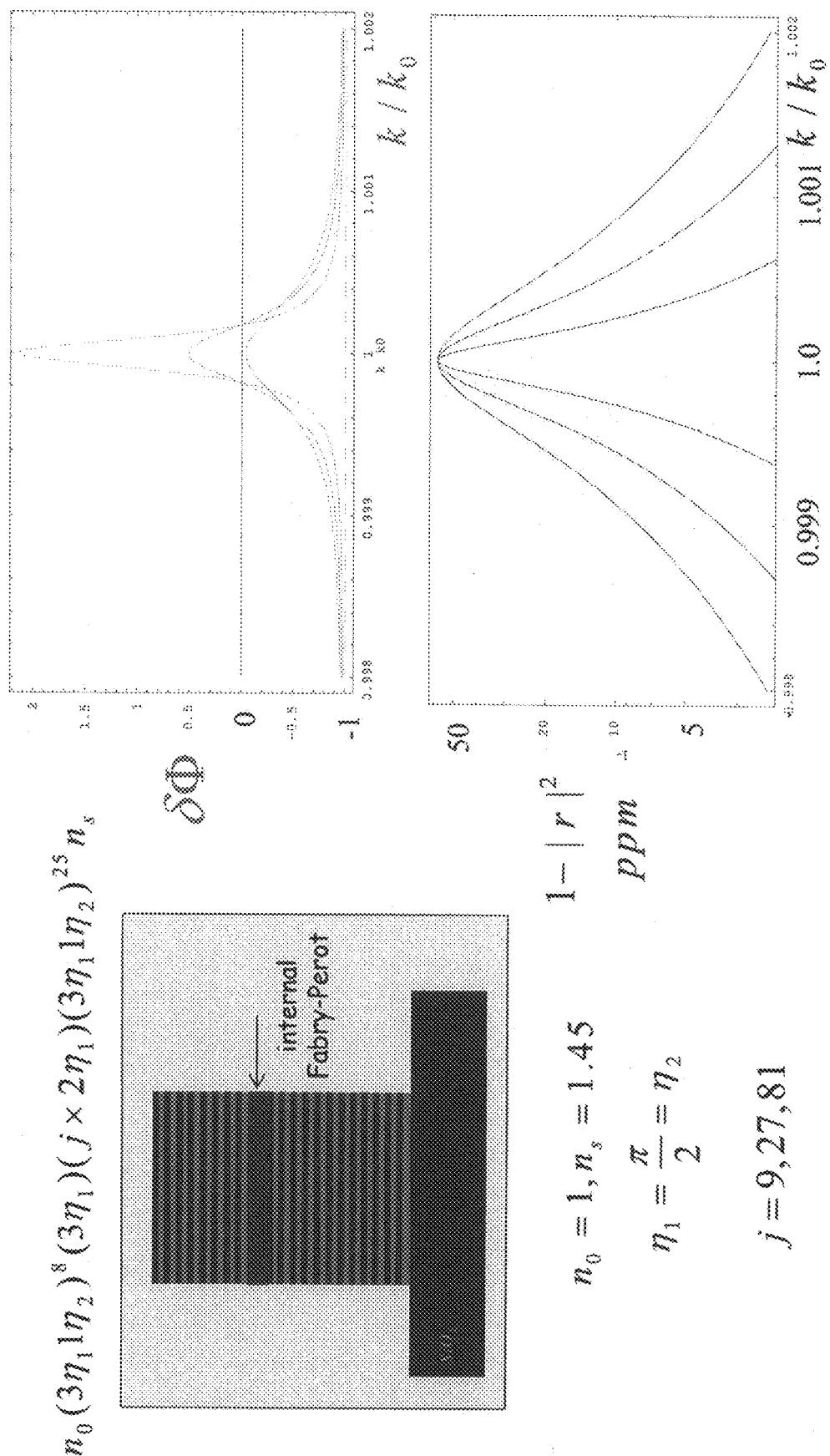
FIG. 11 is a schematic illustrating a mirror of an interferometer according to another embodiment of the present invention.

FIG. 11 illustrates a mirror of an interferometer according to another embodiment of the present invention. Here, the mirror is formed with an optical coating on a mirror substrate ($SiO_2$), and the optical coating has an internal resonant structure (internal Fabry-Perot) between a plurality of first coating layers (e.g., 8 layers) and a plurality of second coating layers (e.g., 25 layers). In one embodiment, the plurality of the first coating layers (e.g., 8 layers) is smaller in number (of layers) than the plurality of second layers (e.g., 25 layers), and/or the plurality of second coating layers is between the internal resonant structure and the mirror substrate. Also, as shown in FIG. 11, the internal resonant structure according to an embodiment of the present invention has a thickness that is a multiple (j) of a half of the wavelength of the given wavevector of the reflected light. Here, as discussed above and by the graphs in FIG. 11, by suitably configuring the internal resonant structure of the optical coating, the coating phase shift $\delta\beta$ can be suitably modified so that the total phase shift $\delta\Phi=\delta\beta+\delta\theta$ can be 0 for wavelength of a given wavevector of a reflected beam of light.

In more detail, as shown in FIG. 11, the mirror of the interferometer includes a mirror substrate and an optical coating on the mirror substrate. Here, a mechanical disturbance of the mirror substrate and the optical coating leads to a reflective surface displacement noise of the mirror. The reflective surface displacement noise produces a first phase shift (e.g., a piston phase shift $\delta\theta$) of a given wavevector reflected from the mirror. The optical coating includes an optical layer (internal Fabry-Perot) configured to produce a second phase shift (e.g., a coating phase shift $\delta\beta$) of the given wavevector and the second phase shift substantially compensating for the first phase shift.

In one embodiment, the second phase shift is produced from a strain of the optical coating that results from the mechanical disturbance.

In one embodiment, the first phase shift and the second phase shift are substantially equal to a total phase shift (e.g., $\delta\Phi$) of the mechanical disturbance, and the optical layer of the optical coating is configured such that the total phase shift is substantially equal to zero (e.g., $\delta\Phi=\delta\beta+\delta\theta=0$).

In one embodiment, the mechanical disturbance is a thermal fluctuation of the mirror substrate and the optical coating. The thermal fluctuation may be a function of the Boltzmann constant ($k_B$) and a given temperature (T).

In one embodiment, the optical coating includes a plurality of first layers (e.g., eight layers) and a plurality of second layers (e.g., 25 layers), and the optical layer is between the plurality of first layers and the plurality of second layers. The plurality of first layers may be smaller in number than the plurality of second layers, and the plurality of second layers is between the optical layer and the mirror substrate.

In one embodiment, a thickness of the optical layer is a multiple (j) of a half of a wavelength of the given wavevector.

Figure 12:
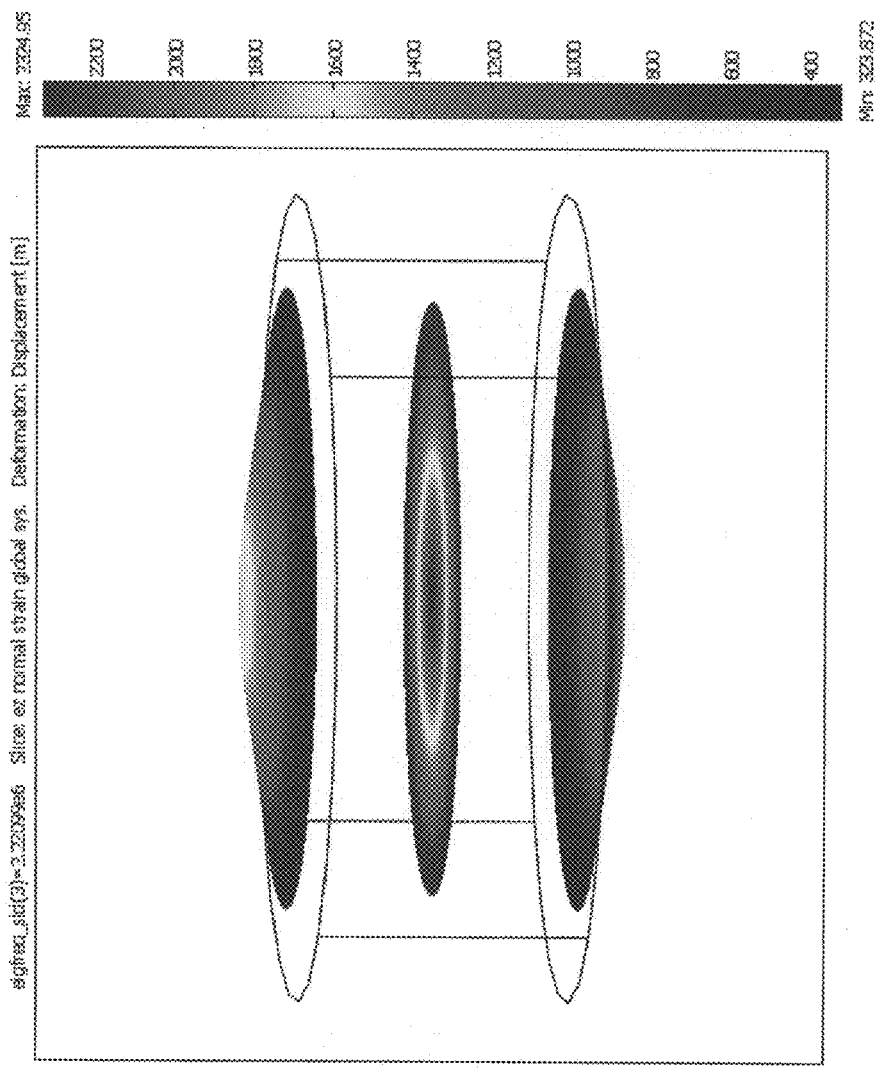
FIG. 12 is a schematic illustrating the strain for a particular eigenmode and of frequency $f_n$=2.22 MHz of a mirror of an interferometer according to another embodiment of the present invention.
Figure 12:
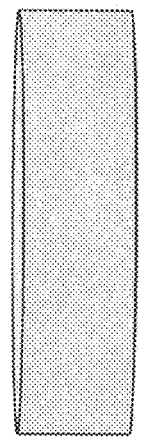

FIG. 12 illustrates an eigenmode of frequency $f_n$=2.22 MHz of a mirror of an interferometer according to another embodiment of the present invention. Here, the mirror is formed with a sapphire substrate that is about 3 mm in diameter and about 1 mm think. Here, an embodiment provides a coating design for an optical coating on the sapphire substrate as described above for which the piston phase shift $\delta\theta$ is coherently compensated by the coating phase shift $\delta\beta$, leading to a total phase shift $\delta\Phi$ of 0 for wavelength of a given wavevector of a reflected light.

Figure 13:
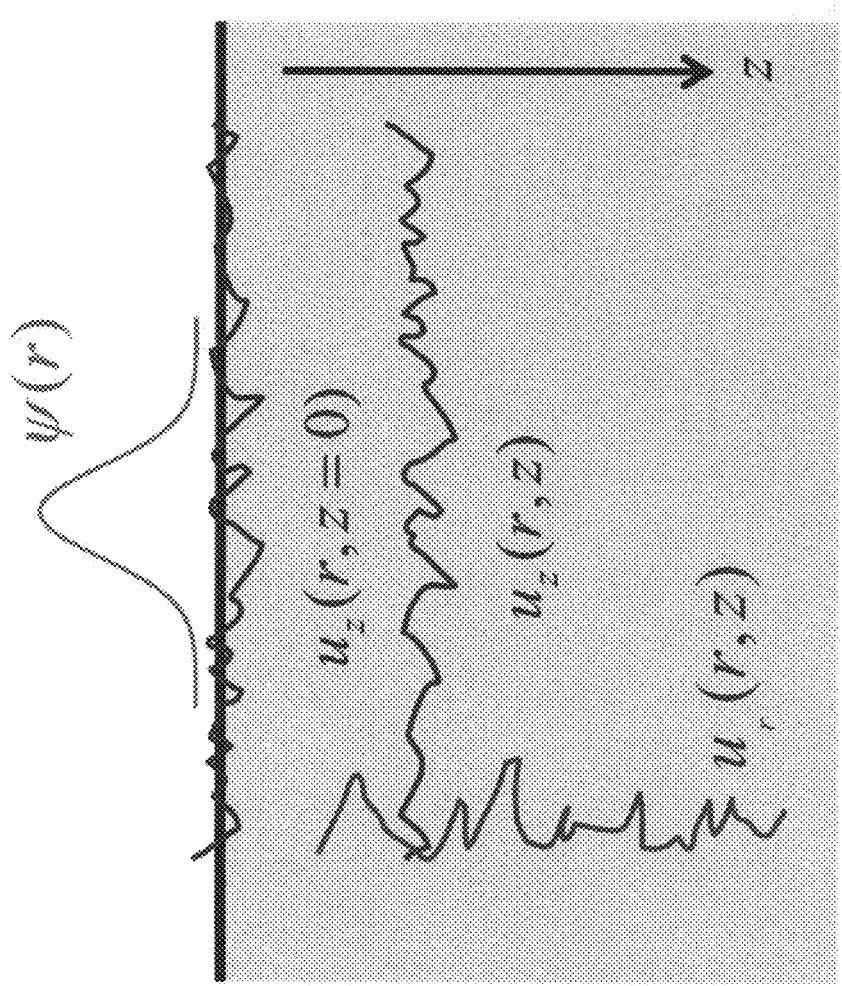
FIG. 13 is a schematic illustrating a quantitative character of the correlation between thermally driven displacements and strains at depth z and the fluctuations of the surface at z=0 of a mirror of an interferometer.

For low frequency thermal noise, it should be apparent to those skilled in the art that a quantitative character of the correlation between thermally driven displacements and strains at depth z and the fluctuations of the surface at z=0 as shown in FIG. 13 can be suitably calculated. The mathematical basis for this correlation (and/or calculation) are discussed in H. B. Callen and R. F. Greene, On a Theorem of Irreversible Thermodynamics II, Phys. Rev. 88, 1387 [6] and Mindin, Force at a Point in the Interior of a Semi-infinite Solid, Physics, Vol. 7 [20], which are incorporated by reference herein in their entirety. Once this correlation is determined, a mirror of an interferometer according to another embodiment can be provided as shown in FIG. 14.

[20] Mindin, Force at a Point in the Interior of a Semi-infinite Solid, Physics, Vol. 7 (1936), the entire content of which is incorporated herein by reference.

Figure 14:
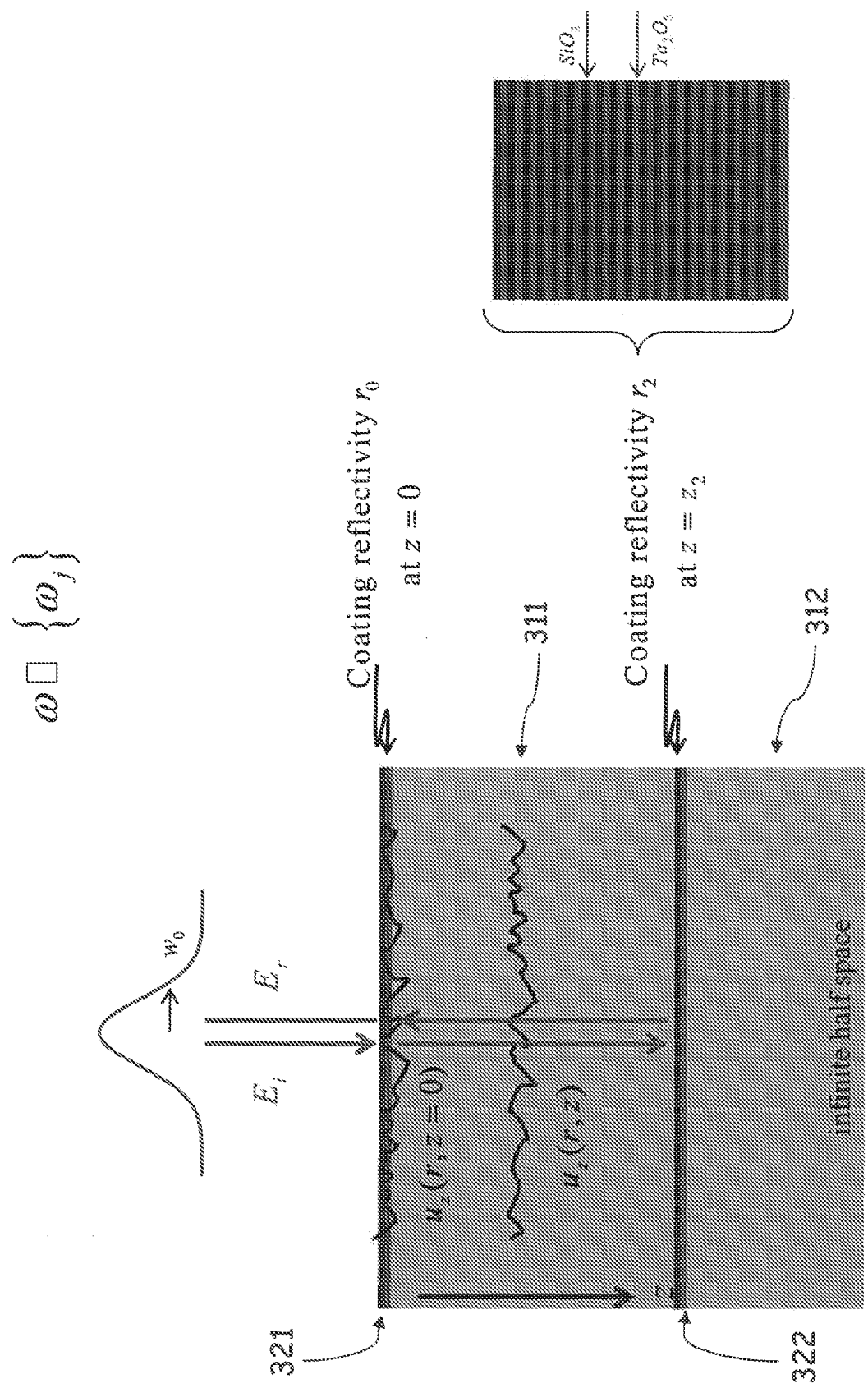
FIG. 14 is a schematic illustrating a mirror of an interferometer that includes a first mirror region of the substrate, a first optical coating, a second region of the mirror substrate and a second optical coating according to another embodiment of the present invention.

Referring to FIG. 14, the mirror includes a first mirror substrate 311, a first optical coating 321, a second mirror substrate 312, and a second optical coating 322. In this embodiment, the first optical coating 321 has a coating reflectivity $r_0$ at z=0, and is on the first mirror substrate 311. The second optical coating 322 has a coating reflectivity $r_2$ at z=$z_2$ and is between the first mirror substrate 311 (e.g., having a thickness that is from 0 to $z_2$) and the second mirror substrate 312 (e.g., having a thickness that is from $z_2$ to infinite half space). Here, a mechanical disturbance of the first and second mirror substrates 311, 312, and the first and second optical coatings 321, 322 leads to a reflective surface displacement noise of the mirror, the reflective surface displacement noise producing a first phase shift of a given wavevector reflected from the mirror, and the first mirror substrate 311 has a thickness configured to produce a second phase shift of the given wavevector, the second phase shift substantially compensating for the first phase shift.

In one embodiment, the mechanical disturbance is a thermal fluctuation of the first and second mirror substrates and the first and second optical coatings. The thermal fluctuation may be a function of the Boltzmann constant ($k_B$) and a given temperature (T).

In one embodiment, the first optical coating includes a plurality of first layers, and the second optical coating includes a plurality of second layers. More generally, multiple coating layers could be distributed throughout the substrate.

In embodiments of the present invention, the reflection (amplitude and phase) from a multilayer dielectric stack (the optical coating) can be calculated by utilizing the mathematical basis as discussed in the book entitled *Thin-Film Optical Filters* by H. A. Macleod [21], which is incorporated by reference herein in its entirety. Here, Chapter 2 in the book gives the mathematical basis for the calculations. In addition, the book discusses a Gires-Tournois (G-T) interferometer (bottom of page 607) that is utilized for phase control of very short optical pulses. The important point for the embodiments of the present invention is that this design gives rise to "a very rapid change of phase on reflection" (top of page 609). As such, it should be apparent to those skilled in the art that phase compensation of surface motion by way of strain-induced changes in the optical coating can be achieved according to the embodiments of the present invention.

[21] H. A. Macleod, Thin-Film Optical Filters, 3rd ed., Institute of Physics Publishing, the entire content of which is incorporated herein by reference.

Also, according to an embodiment of the present invention, a method is provided that utilizes the Fluctuation-Dissipation Theorem. Here, in Step 1, the method employs the relationship in Eq. 5.6 on page 1389 of the H. B. Callen and R. F. Greene, On a Theorem of Irreversible Thermodynamics. II, Phys. Rev. 88, 1387 [6], which is incorporated by reference in its entirety, to relate various correlation functions to the "admittance" Y. The correlation functions <xi_i xi_j> describe how two variables xi_i and xi_j relate when the system is spontaneously fluctuating in thermal equilibrium.

In Step 2, to make these formal equations useful, an embodiment of the present invention calculates the admittance Y for an actual problem of a mirror substrate. This calculation is achieved by using the results from a paper by Mindin, Force at a Point in the Interior of a Semi-infinite Solid, Physics, Vol. 7 [20], which is incorporated by reference herein in its entirety. Mindlin's solution provides "the Green function" from which is used to calculate the response not to a point of perturbation but to a Gaussian distribution corresponding to an incident laser field.

In its general form, this method of calculation is derived from a paper by Y. Levin [8], which employed the calculations in Callen and Greene, On a Theorem of Irreversible Thermodynamics, Phys. Rev. 86, 702, Eq. 5.7, page 706 [5]. In the literature, Levin's technique [8] is applied to surface fluctuations (as in the paper by Liu and Thorne [10], which is incorporated by reference herein in its entirety) and not to thermal fluctuations INSIDE the mirror substrate. The fluctuations inside the mirror give rise to strains that can affect the coating, be it on the surface of the substrate or distributed within the substrate.

As embodiments of the present invention employ these techniques (and as in Levin's paper [8] and the paper by Liu and Thorne [10]), the fluctuations considered are at low frequency below any resonances for the system (the so-called quasi-static regime). This regime is difficult for having internal strains compensate the surface motion, and a thin coating at the surface will not work. Hence, according to one embodiment of the present invention, the coating design with two mirrors with reflectivities $r_0$, $r_2$ is provided as a solution, and as described above in FIG. 14 and in the proof of concept design for $\omega \ll \{\omega_i\}$ of the presentation by H. Jeff Kimble in Caltech, entitled The Quest for Optical Interferometers with Insensitivity to Thermal Noise [22], which is incorporated by reference herein in its entirety.

[22] H. Jeff Kimble, The Quest for Optical Interferometers with Insensitivity to Thermal Noise, Caltech Information Technology Services (Mar. 20, 2008), the entire content of which is incorporated herein by reference.

A completely different approach is to look at a resonant mode, as in the picture for a small cylinder of sapphire as shown in FIG. 12 and in the Kimble presentation [23]. In this case, the mode shape and associated strains have to be calculated numerically. Given the axial strain per unit surface displacement for a particular mode, the effect on a thin coating at the surface can be calculated. Note that this is the case that corresponds to the coating with a half-wave resonant structure embedded, as for the G-T interferometer in Macleod's book [21]. In addition, embodiments of the present invention for the compensation of internal thermal noise are discussed in the presentation by H. Jeff Kimble in MLA, entitled The Quest for Optical Interferometers with Insensitivity to Thermal Noise [23], which is incorporated by reference herein in its entirety.

[23] H. Jeff Kimble, The Quest for Optical Interferometers with Insensitivity to Thermal Noise, Caltech Information Technology Services (May 24, 2007), the entire content of which is incorporated herein by reference.

Also, while embodiments of the present invention have been utilized to compensate for internal thermal noise, the present invention is not thereby limited. For example, embodiments of the present invention can also be utilized for thermal noise that arises within the coating itself.

In view of the foregoing, an embodiment of the present invention provides a scheme for substantially reducing or compensating a mechanical disturbance, such as a thermally driven phase noise in which the strain-induced phase shift from a mirror's optical coating cancels that due to the concomitant motion of a substrate's surface. As such, although the position of the physical surface may fluctuate, the optical phase upon reflection can still be substantially insensitive to this concomitant motion.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A mirror of an optical interferometer, the mirror comprising:
   a mirror substrate; and
   an optical coating on the mirror substrate, wherein a mechanical disturbance of the mirror substrate and the optical coating leads to a reflective surface displacement noise of the mirror, the reflective surface displacement noise producing a first phase shift of a given wavevector reflected from the mirror, and
   the optical coating comprising an optical layer configured to produce a second phase shift of the given wavevector, the second phase shift substantially compensating for the first phase shift, and
   wherein the optical coating comprises a plurality of first layers and a plurality of second layers, the optical layer being positioned between the plurality of first layers and the plurality of second layers.

2. The mirror of claim 1, wherein the second phase shift is produced from a strain of the optical coating, the strain resulting from the mechanical disturbance.

3. The mirror of claim 1, wherein the first phase shift and the second phase shift are substantially equal to a total phase shift of the mechanical disturbance, and wherein the optical layer of the optical coating is configured such that the total phase shift is substantially equal to zero.

4. The mirror of claim 1, wherein the mechanical disturbance is a thermal fluctuation of the mirror substrate and the optical coating.

5. The mirror of claim 4, wherein the thermal fluctuation is function of a Boltzmann constant and a given temperature.

6. The mirror of claim 1, wherein the plurality of first layers is smaller in number than the plurality of second layers, and wherein the plurality of second layers is between the optical layer and the mirror substrate.

7. A mirror of an optical interferometer, the mirror comprising:
   a mirror substrate; and
   an optical coating on the mirror substrate,
   wherein a mechanical disturbance of the mirror substrate and the optical coating leads to a reflective surface displacement noise of the mirror, the reflective surface displacement noise producing a first phase shift of a given wavevector reflected from the mirror, and
   the optical coating comprising an optical layer configured to produce a second phase shift of the given wavevector, the second phase shift substantially compensating for the first phase shift, and
   wherein a thickness of the optical layer is a multiple of a half of a wavelength of the given wavevector.

8. The mirror of claim 7, wherein the second phase shift is produced from a strain of the optical coating, the strain resulting from the mechanical disturbance.

9. The mirror of claim 7, wherein the first phase shift and the second phase shift are substantially equal to a total phase shift of the mechanical disturbance, and wherein the optical layer of the optical coating is configured such that the total phase shift is substantially equal to zero.

10. The mirror of claim 7, wherein the mechanical disturbance is a thermal fluctuation of the mirror substrate and the optical coating.

11. The mirror of claim 10, wherein the thermal fluctuation is function of a Boltzmann constant and a given temperature.

12. A mirror of an optical interferometer, the mirror comprising:
   a first region of a first mirror substrate;
   a first optical coating on the first region of the first mirror substrate;
   a second region of a second mirror substrate; and
   a second optical coating between the first region of the first mirror substrate and the second region of the second mirror substrate;
   wherein a mechanical disturbance of the first and second regions of the mirror substrates and the first and second optical coatings leads to a reflective surface displacement noise of the mirror, the reflective surface displacement noise producing a first phase shift of a given wavevector reflected from the mirror, and
   wherein the first region of the first mirror substrate has a thickness configured to produce a second phase shift of the given wavevector, the second phase shift substantially compensating for the first phase shift.

13. The mirror of claim 12, wherein the mechanical disturbance is a thermal fluctuation of the first and second regions of the mirror substrates and the first and second optical coatings.

14. The mirror of claim 13, wherein the thermal fluctuation is function of a Boltzmann constant and a given temperature.

15. The mirror of claim 12, wherein the first optical coating comprises a plurality of first layers, and the second optical coating comprises a plurality of second layers.

* * * * *